United States Patent
Fraser et al.

(10) Patent No.: US 7,372,818 B2
(45) Date of Patent: May 13, 2008

(54) MOBILE VEHICLE QUIESCENT CYCLE CONTROL METHOD

(75) Inventors: Ronald W. Fraser, Lake Orion, MI (US); Edward J. Abeska, Ferndale, MI (US); William E. Mazzara, Jr., Drayton Plains, MI (US)

(73) Assignee: General Motors Corporation, Detroit, MI (US)

( * ) Notice: Subject to any disclaimer, the term of this patent is extended or adjusted under 35 U.S.C. 154(b) by 1068 days.

(21) Appl. No.: 10/109,466

(22) Filed: Mar. 28, 2002

(65) Prior Publication Data

US 2003/0185162 A1 Oct. 2, 2003

(51) Int. Cl.
*H04J 1/16* (2006.01)
(52) U.S. Cl. .............. 370/252; 370/329; 340/7.32
(58) Field of Classification Search .............. 370/278, 370/252, 328, 329, 349, 318, 437; 375/130, 375/220–222; 455/62, 522, 575, 426, 450; 340/426.2, 693.3, 3.1, 7.32, 539.1, 539.3
See application file for complete search history.

(56) References Cited

U.S. PATENT DOCUMENTS

| | | | |
|---|---|---|---|
| 5,491,837 A * | 2/1996 | Haartsen .............. 455/62 |
| 5,627,882 A | 5/1997 | Chien et al. |
| 5,644,576 A * | 7/1997 | Bauchot et al. .............. 370/437 |
| 6,674,788 B2 * | 1/2004 | Lomp et al. .............. 375/130 |
| 6,792,040 B1 * | 9/2004 | Davis et al. .............. 375/222 |
| 2002/0155832 A1 * | 10/2002 | Stucky et al. .............. 455/426 |

FOREIGN PATENT DOCUMENTS

| | | |
|---|---|---|
| DE | 40 01 810 C2 | 7/1991 |
| DE | 100 40 604 A1 | 3/2002 |
| JP | HEI 6-350508 | 12/1994 |
| JP | HEI 10-210563 | 8/1998 |
| JP | 2001/345752 | 12/2001 |

OTHER PUBLICATIONS

German Office Action from the German Patent and Trademark Office dated Oct. 13, 2004.

* cited by examiner

*Primary Examiner*—John Pezzlo (57) ABSTRACT

The present invention provides a method of accessing a quiescent mobile vehicle using a wireless communication system. At least one transmit power parameter of a vehicle communication device is determined. At least one sleep duration value is calculated based on the transmit power parameter. The vehicle communication device is placed into a quiescent state based on the sleep duration value. Programs and systems of using the method are also provided.

8 Claims, 4 Drawing Sheets

MOBILE VEHICLE QUIESCENT CYCLE CONTROL METHOD

FIELD OF THE INVENTION

This invention relates to a mobile communication method.

BACKGROUND OF THE INVENTION

Wireless communication services for mobile vehicles, such as navigation and roadside assistance, have increased rapidly in recent years. Most of the services that have been offered are for a mobile vehicle in operation, but more recently, the demands and potential for services to a turned-off vehicle have grown. Services that may be requested while the vehicle is off or in a quiescent mode may include maintenance and diagnostic functions, system updates, vehicle position determination, unlocking of the doors, or vehicle alarm silencing.

Normally when the mobile vehicle is off, it is placed into a powered-down cycle. A communication device in a telematics unit on or in communication with each other and with the vehicle may also be placed into a discontinous-receive-DRx cycle to minimize power drain on the battery. To perform a requested function while the ignition is off, the vehicle may be awakened, the desired function performed, and the vehicle subsequently placed back into the DRx cycle.

One method currently in use is to synchronize the wake-up time of the DRx cycle with an incoming call from a telematics or service call center. When the vehicle is awakened, a call may be received and responded to appropriately. The time period between wake-up operations may vary from ten minutes to several days or more if the vehicle has not been moved or driven. To coordinate the wake-up function with the call from the call center, the time at the call center may need to be synchronized with time at the mobile vehicle. A global positioning system (GPS) unit in the mobile vehicle may provide an accurate reading of time. After the call is received and the vehicle responds, the vehicle may be put back into the DRx cycle again after a predetermined duration, minimizing battery drain. The DRx cycle may comprise, for example, awake durations, during which the vehicle may communicate with the call center and sleep durations, during which the vehicle is asleep but capable of being awakened. This DRx cycle may last for a set amount of time.

Unfortunately, a prescribed, coordinated DRx cycle with prescribed sleep interval duration and a prescribed wake-up schedule may not always accommodate the needs of the user or service subscriber. For example, a vehicle in long-term parking at an airport may have been turned off for a period which exceeds the time period allotted for its DRx cycle (e.g., the vehicle has been set to use cycle for three days and the vehicle is left turned off for four days). This becomes a difficulty when the subscriber, upon arriving at his vehicle, requires immediate telematic assistance (e.g., on day four, the subscriber returns to find the keys have been locked in the vehicle and requires telematic assistance to unlock the vehicle.) In another example, a vehicle may enter the DRx cycle too soon (e.g., the vehicle is set to enter cycle as soon as the ignition goes off). This becomes a difficulty when the subscriber, upon turning off the vehicle discovers he needs telematic assistance and must wait until the DRx cycle goes from a sleep interval into a wakeup interval before requesting the assistance.

In addition, when a vehicle awakens, it may be required to register with a local wireless carrier before sending or receiving a call. In certain instances, the time required for responding to a service request or receiving communication, service or software updates for the vehicle and the communication requirements may extend beyond the predetermined awakened duration. In other situations, a call may not be able to be completed during the awakened period due to high call loads on the call center or wireless service provider. Therefore, it may be beneficial to be able to alter wakeup duration and period between wake-ups, accommodating the actual or anticipated requests.

A method is needed to make vehicle services more available even when the vehicle is powered down or turned off. This would result in increased subscriber satisfaction with the services. Increased availability of services is generally compromised by the need to maintain low power consumption.

An improved method may also ease the strain on the call center, for example, by avoiding the need for multiple call attempts to a vehicle during a wake-up period or by allowing the call attempt pattern for contacting numerous vehicles to be staggered or altered. An improved method would further allow an extension of time for the vehicle to complete the requested service during the wake-up period, and an alteration of the predetermined time for initiating the wake-up period. One desirable method improves the availability of a vehicle to receive and perform a service request, while maintaining low power consumption.

Co-pending U.S. patent application Ser. No. 10/011,689 to Applicant describes one method of placing the vehicle in a discontinuous receive (DRx) mode, e.g., a mode in which the vehicle can remain in a low-current state for as much time as possible while the vehicle's ignition is off, while occasionally entering an "awake" state for receiving services if necessary. Currently this process of discontinuous receive is accomplished with analog cellular hardware. Analog hardware may limit the amount of time that a vehicle unit can remain awake during an "awake" period.

A method is needed therefore to improve current drain over the analog technology by taking advantage of digital cellular and PCS technology. A method may further be needed which uses various network parameters to dynamically control the DRx behavior, in particular by relating the parameters of the DRx cycle to the parameters of one or more wireless networks.

It is an object of this invention, therefore, to provide a method for improving the availability of a quiescent vehicle to receive and perform a service request, and to overcome the deficiencies and obstacles described above.

SUMMARY OF THE INVENTION

Advantageously, according to a preferred example, this invention provides a method for use in a mobile vehicle for communicating over a wireless communication system, comprising; determining at least one registration parameter responsive to communication between a vehicle communication device and a wireless network; adjusting a quiescent operating cycle of the vehicle communication device based on the determination; and operating the vehicle communication device according to the adjusted quiescent openting cycle.

The aforementioned, and other features and advantages of the invention will become further apparent from the following detailed description of the presently preferred embodiments, read in conjunction with the accompanying drawings.

The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
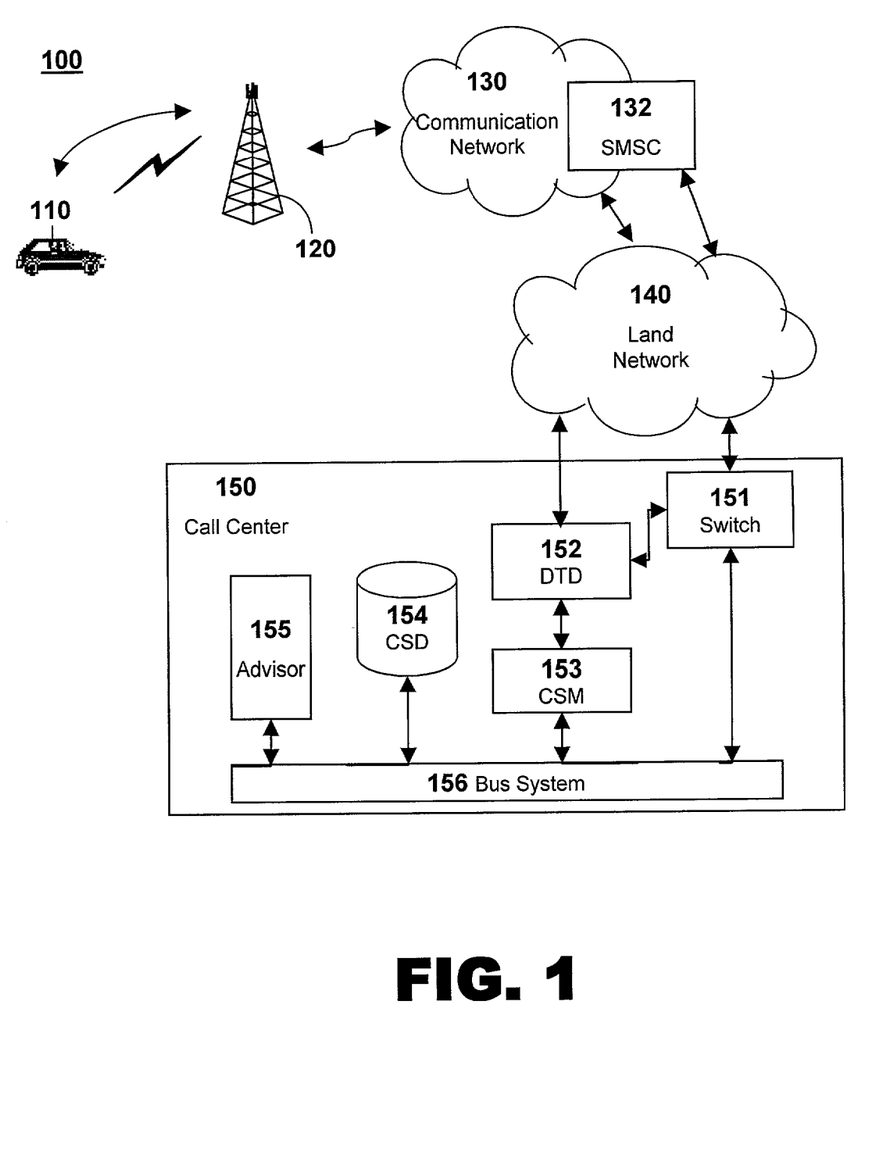
FIG. 1 is an illustration of one embodiment of a system for accessing a quiescent mobile vehicle using a wireless communication system, in accordance with the present invention.

FIG. 1 shows an illustration of one embodiment of a system for accessing a quiescent mobile vehicle using a wireless communication system, in accordance with the present invention at 100.

Mobile vehicle access system 100 may contain one or more mobile vehicles 110, one or more wireless carrier systems 120, one or more communication networks 130, one or more short message service centers 132, one or more land networks 140, and one or more call centers 150. Call center 150 may contain one or more switches 151, one or more data transmission devices 152, one or more communication services managers 153, one or more communication services databases 154, one or more advisors 155, and one or more bus systems 156.

Mobile vehicle 110 may contain a wireless vehicle communication device, such as an analog or digital phone with suitable hardware and software for transmitting and receiving data communications. Mobile vehicle 110 may contain a wireless modem for transmitting and receiving data. Mobile vehicle 110 may contain a digital signal processor with software and additional hardware to enable communications with the mobile vehicle and to perform other routines and requested services. Mobile vehicle 110 may contain a global positioning system (GPS) unit capable of determining synchronized time and a geophysical location of the mobile vehicle. Mobile vehicle 110 may send to and receive radio transmissions from wireless carrier system 120.

Wireless carrier system 120 may be a wireless communications carrier. Wireless carrier system 120 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 120 may transmit to and receive signals from mobile vehicle 110. Wireless carrier system 120 may transmit to and receive signals from a second mobile vehicle 110. Wireless carrier system 120 may be connected with communications network 130.

Communications network 130 may comprise a mobile switching center. Communications network 130 may comprise services from one or more wireless communications companies. Communications network 130 may be any suitable system or collection of systems for connecting wireless carrier system 120 to a second mobile vehicle 110 or to a call center.

Communications network 130 may include one or more short message service centers 132. Short message service center 132 may prescribe alphanumeric short messages to and from mobile vehicles 110. Short message service center 132 may include message entry features, administrative controls, and message transmission capabilities. Short message service center 132 may store and buffer the messages. Short message services may include functional services such as paging, text messaging and message waiting notification. Short message services may include other telematics services such as broadcast services, time-driven message delivery, autonomous message delivery, and database-driven information services. The telematics services may further include message management features, such as message priority levels, service categories, expiration dates, cancellations, and status checks.

Land network 140 may be a public-switched telephone network. Land network 140 may be comprised of a wired network, an optical network, a fiber network, another wireless network, or any combination thereof. Land network 140 may comprise an Internet protocol (IP) network. Land network 140 may connect communications network 130 to a call center.

Land network 140 may connect a first wireless carrier system 120 with a second wireless carrier system 120. Communication network 130 and land network 140 may connect wireless carrier system 120 to a communication node or call center 150.

Call center 150 may be a location where many calls may be received and serviced at the same time, or where many calls may be sent at the same time. The call center may be a telematics call center, prescribing communications to and from mobile vehicles 110. The call center may be a voice call center, providing verbal communications between an advisor in the call center and a subscriber in a mobile vehicle. The call center may contain each of these functions.

The call center may contain switch 151. Switch 151 may be connected to land network 140, and may receive a modem signal from an analog modem or from a digital modem. Switch 151 may transmit voice or data transmission from the communication node. Switch 151 may also receive voice or data transmissions from mobile vehicle 110 through wireless carrier system 120, communications network 130, and land network 140. Switch 151 may receive from or send data transmissions to data transmission device 152. Switch 151 may receive from or send voice transmissions to advisor 155 via bus system 156.

Data transmission device 152 may send or receive data from switch 151. Data transmission device 152 may be an IP router or a modem. Data transmission device 152 may transfer data to or from advisor 155, one or more communication services managers 153, one or more communication services databases 154, and any other device connected to bus system 156. Data transmission device 152 may convey information received from short message service center 132 in communication network 130 to communication services manager 153.

Communication services manager 153 may be connected to switch 151, data transmission device 152, and advisor 155 through bus system 156. The call center may contain any combination of hardware or software facilitating data transmissions between call center 150 and mobile vehicle 110.

Communication services manager 153 may receive information from mobile vehicle 110 through wireless carrier system 120, short message service center 132 in communication network 130, land network 140, and data transmission device 152. Communication services manager 153 may send information to mobile vehicle 110 through data transmission device 152, land network 140, communication network 130 and wireless carrier system 120. Communication services manager 153 may send short message service messages via short message service center 132 to the mobile vehicle. Communication services manager 153 may receive short message service replies from mobile vehicle 110 via short message service center 132. Communication services manager 153 may send a short message service request to mobile vehicle 110.

Communication services database 154 may contain records on one or more mobile vehicles 110. A portion of communication services database 154 may be dedicated to short message services. Records in communication services database 154 may include vehicle identification, location information, status information, and recent action information regarding mobile vehicle 110. Communication services database 154 may provide information and other support to communication services manager 153.

Advisor 155 may be a real advisor or a virtual advisor. A real advisor may be a human being in verbal communication with mobile communication device 110. A virtual advisor may be a synthesized voice interface responding to requests from mobile communication device 110. Advisor 155 may provide services to mobile communication device 110. Advisor 155 may communicate with communication services manager 153 or any other device connected to bus system 156.

Figure 2:
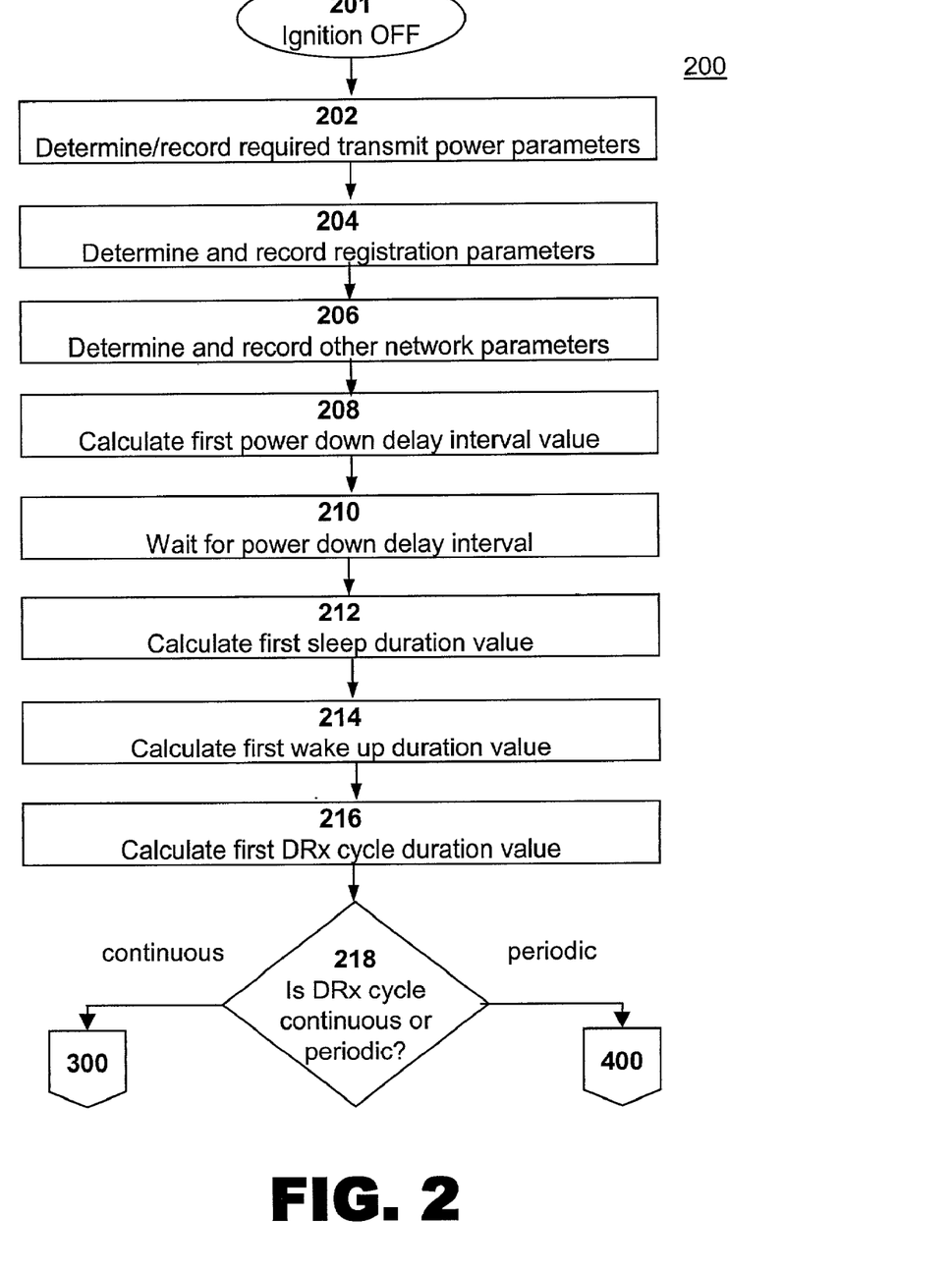
FIG. 2 is a flow diagram of one embodiment of a method for dynamically determining values to be used during a sleep cycle in a quiescent mobile vehicle, in accordance with the present invention.

FIG. 2 shows one embodiment of a method for dynamically determining values to be used during a sleep cycle in a quiescent mobile vehicle, in accordance with the present invention at 200.

The method of FIG. 2 may be used, for example, if digital communication service is available to the vehicle for achieving a discontinuous receive (DRx) sleep cycle. In some embodiments of the invention, one or more communication services are made available to mobile vehicle 110 via a wireless vehicle communication device, such as an analog or digital phone with suitable hardware and software for transmitting and receiving data communications. Mobile vehicle 110 may also contain a wireless modem for transmitting and receiving data. Mobile vehicle 110 may further contain a digital signal processor with software and additional hardware to enable communications with the mobile vehicle and to perform other routines and requested services. Mobile vehicle 110 may contain a global positioning system (GPS) unit capable of determining synchronized time and a geophysical location of the mobile vehicle.

As seen at block 200, the cycle of the present invention may begin as soon as the ignition of the vehicle is turned off. In some embodiments of the invention, although the ignition of the vehicle is off, the vehicle communication device is not yet completely powered off.

At block 202, required transmit power parameters for the vehicle communication device may be determined and recorded. For example, the amount of transmit power required for the vehicle communication device to transmit a wireless signal over a specific period of time may be determined and/or recorded. Several methods are known in the art for measuring the transmit power level of a wireless device. In one embodiment of the invention, for example, this transmit power level measurement is a CDMA measurement. The transmit power level measurement may be measured, for example, as the vehicle communication device makes a transmission attempt during block 202. The value of the transmit power level measurement, once determined, may be stored by vehicle communication device for further use in accordance with the present invention.

Typically, the required transmit power parameters may vary depending on which network the vehicle communication device is attempting to contact. For example, a nearby network may require a lower power level for transmission of a registration attempt than a network further away. Alternatively, a more powerful wireless carrier may be able to receive transmissions sent with a lower power level than a less powerful wireless carrier.

At block 204, registration parameters for the vehicle communication device may be determined and recorded. The registration parameters for the vehicle communication device may include, for example, the number of times that the vehicle communication device attempts to register with a communication network 130, 140 via a wireless carrier system 120. Calculations of the registration parameters may also take into account the power level required to register with a particular communication network 130, 140, determined at 202 above. Typically, these registration parameters may vary from wireless network to wireless network. For example, one network may require registration attempts every ten minutes (e.g., six registration attempts per hour), which requires less power use than one that requires registration attempts every five minutes (e.g., twelve registration attempts per hour).

Several methods are known in the art for measuring the transmit power level used in a registration attempt of a wireless device. Several methods are also known in the art for logging the number of registration attempts made by a particular device in a given time period. The registration parameters discussed above may be measured, for example, as the vehicle communication device makes one or more registration attempts during block 202. The values of the various registration parameters, once determined, may be stored by vehicle communication device for further use in accordance with the present invention.

At block 206, any other network parameters may be determined and recorded. For example, some embodiments of the invention may use CDMA technology. In such embodiments, it may be determined if a slot control index (SCI) is used by the vehicle communication device. If the vehicle communication device uses an SCI, the amount of power needed by the vehicle communication device to use the SCI may be determined and recorded for further use in accordance with the present invention. In another embodiment of the invention, it may be determined if the vehicle communication device uses a quick paging channel (QPC) feature. If the vehicle communication device uses a QPC feature, the amount of power needed to use the QPC feature may be determined and recorded for further use in accordance with the present invention. As will be apparent to those skilled in the art, any other functions used by vehicle communication device for wireless communication may also be determined, as well as the amount of power used by such functions, in accordance with the present invention. For example, data affecting power consumption, other such power-related data and any suitable network related parameters may be determined and suitable values may be dynamically calculated from this data in accordance with the present invention. These power values, may include, for example, power available to a vehicle communication device from its own sources, from a vehicle to which it is connected (the vehicle's power system). The power values may also include power required to run a given vehicle communication device.

As seen at block 208, a first value may be determined for a power down delay interval. The value of the power down delay interval may be calculated and re-calculated dynamically any suitable number of times in accordance with the present invention. This power down delay interval value may be determined using any suitable means known in the art. In accordance with the present invention, a suitable algorithm may determine the power down delay interval. This algorithm may calculate the power down delay interval value based on the transmit power parameters recorded at block 202, on the registration parameters recorded at block 204, on the other network parameters recorded at block 206 or based on any suitable combination of the values gathered at blocks 202, 204, 206. Alternatively, the algorithm for determining the power down delay interval value may be based on values obtained for a DRx sleep duration at block 212, values obtained for a wakeup duration at block 214, values obtained for a DRx cycle duration at block 216, or any suitable combination of the values obtained at block 212, 214, 216. Alternatively, the power down delay interval may be preset based on the specifications of the mobile vehicle or the vehicle communication device (for instance, these values may be preset as the vehicle is assembled). Alternatively, the user of a mobile vehicle or the vehicle's communication device may set the value of the power down delay interval.

At block 210, the power down delay interval may be allowed to elapse before the vehicle communication device actually powers down. As discussed above, the value of the power down delay interval may be any suitable time value. For example, in one embodiment of the invention, the power down delay interval may be 10 minutes. This power down delay interval may be a predetermined amount of time before the vehicle communication device powers down. The power down delay interval may allow a subscriber to use the vehicle communication device immediately after the vehicle's ignition is off. One such instance may be if a subscriber locks his keys in the car and would like to use telematics to unlock the car. The power down delay interval allows delivery of telematics services for a time period immediately after the ignition has been turned off so that the subscriber does not have to wait through a sleep interval before a wakeup interval begins.

In one embodiment of the invention, the determinations made at blocks 212, 214, and 216 may be made while the power down delay interval elapses during block 210.

As seen at block 212, a value may be determined for a sleep duration. The value of the sleep duration may be calculated and re-calculated dynamically any suitable number of times in accordance with the present invention. The value of the sleep duration may be determined using any suitable means known in the art. In accordance with the present invention, a suitable algorithm may determine the sleep duration value. This algorithm may calculate the sleep duration value based on the transmit power level recorded at block 202, on the registration parameters recorded at block 204, on the other power values recorded at block 206 or based on any suitable combination of the values gathered at blocks 202, 204, 206. Alternatively, the algorithm for determining the sleep duration value may be based on values obtained for a wakeup duration at block 214, values obtained for a DRx cycle duration at block 216, values obtained for a power down delay interval at block 208, or any suitable combination of the values obtained at block 208,214,216.

The sleep duration may also be preset based on the specifications of the mobile vehicle or the vehicle communication device (for instance, these values may be preset as the vehicle is assembled). Alternatively, the user of a mobile vehicle or the vehicle's communication device may set the value of the sleep duration.

As seen at block 214, a value may be determined for a wakeup duration. The value of the wakeup duration may be calculated and re-calculated dynamically any suitable number of times in accordance with the present invention. The value of the wakeup duration may be determined using any suitable means known in the art. In accordance with the present invention, a suitable algorithm may determine the wakeup duration value. This algorithm may calculate the wakeup duration value based on the transmit power level recorded at block 202, on the registration parameters recorded at block 204, on the other power values recorded at block 206 or based on any suitable combination of the values gathered at blocks 202, 204, 206. Alternatively, the algorithm for determining the wakeup duration value may be based on values obtained for a DRx sleep duration at block 212, values obtained for a DRx cycle duration at block 216, values obtained for a power down delay interval at block 208, or any suitable combination of the values obtained at block 208, 212, 216. Alternatively, the wakeup duration may be preset based on the specifications of the mobile vehicle or the vehicle communication device (for instance, these values may be preset as the vehicle is assembled). Alternatively, the user of a mobile vehicle or the vehicle's communication device may set the value of the wakeup duration.

As seen at block 216, a value may be determined for a DRx cycle duration. The value of the DRx cycle duration may be calculated and re-calculated dynamically any suitable number of times in accordance with the present invention. The value of the DRx cycle duration may be determined using any suitable means known in the art. In accordance with the present invention, a suitable algorithm may determine the DRx cycle duration value. This algorithm may calculate the DRx cycle duration value based on the transmit power level recorded at block 202, on the registration parameters recorded at block 204, on the other power values recorded at block 206 or based on any suitable combination of the values gathered at blocks 202, 204, 206. Alternatively, the algorithm for determining the DRx cycle duration value may be based on values obtained for a DRx sleep duration at block 212, values obtained for a wakeup duration at block 214, values obtained for a power down delay interval at block 216, or any suitable combination of the values obtained at block 212, 214, 216. Alternatively, the DRx cycle duration may be preset based on the specifications of the mobile vehicle or the vehicle communication device (for instance, these values may be preset as the vehicle is assembled). Alternatively, the user of a mobile vehicle or the vehicle's communication device may set the value of the DRx cycle duration.

At block 218, it may be determined if the DRx cycle is a periodic or continuous Sleep cycle. Although only two Sleep cycle types are described, periodic and continuous, the type of Sleep cycle used by a particular vehicle communication device may be any suitable Sleep cycle type known in the art. The Sleep cycle type may be preset based on the specifications of the mobile vehicle or the vehicle communication device (for instance, the type may be preset as the vehicle is assembled). Alternatively, the user of a mobile vehicle or the vehicle's communication device may set the type of Sleep cycle to be used by the vehicle. Alternatively the values determined above may be used to determine if the DRx cycle should be periodic or continuous. For example, if the transmit power level recorded at block 202, the registration parameters recorded at block 204, or the other power values recorded at block 206 indicate that a periodic Sleep cycle would be best suited to the vehicle's power needs, the DRx cycle may be continuous. Alternatively, determination of Sleep cycle type may be based on values obtained for a DRx sleep duration at block 212, values obtained for a wakeup duration at block 214, values obtained for a power down delay interval at block 216, or any suitable combination of the values obtained at block 212,214, 216.

If the Sleep cycle is continuous, the routine may proceed to block 300 as described further below in FIG. 3.

Figure 4:
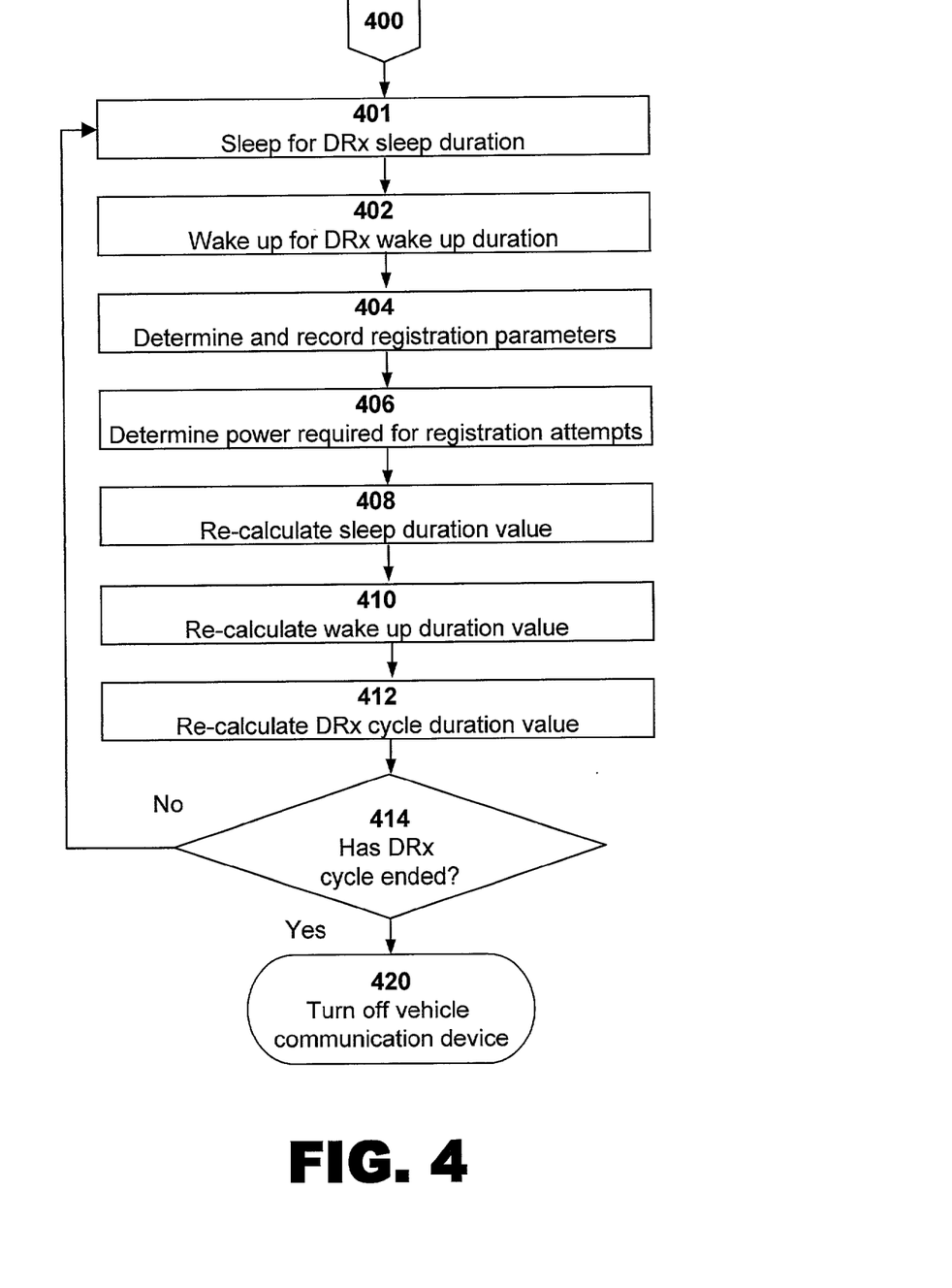
FIG. 4 is a flow diagram of another embodiment of a subroutine of the method shown in FIG. 2.

Alternatively, if at block 218, it is determined the Sleep cycle is periodic, the vehicle communication device may continue with the subroutine described in FIG. 4 at 400.

Figure 3:
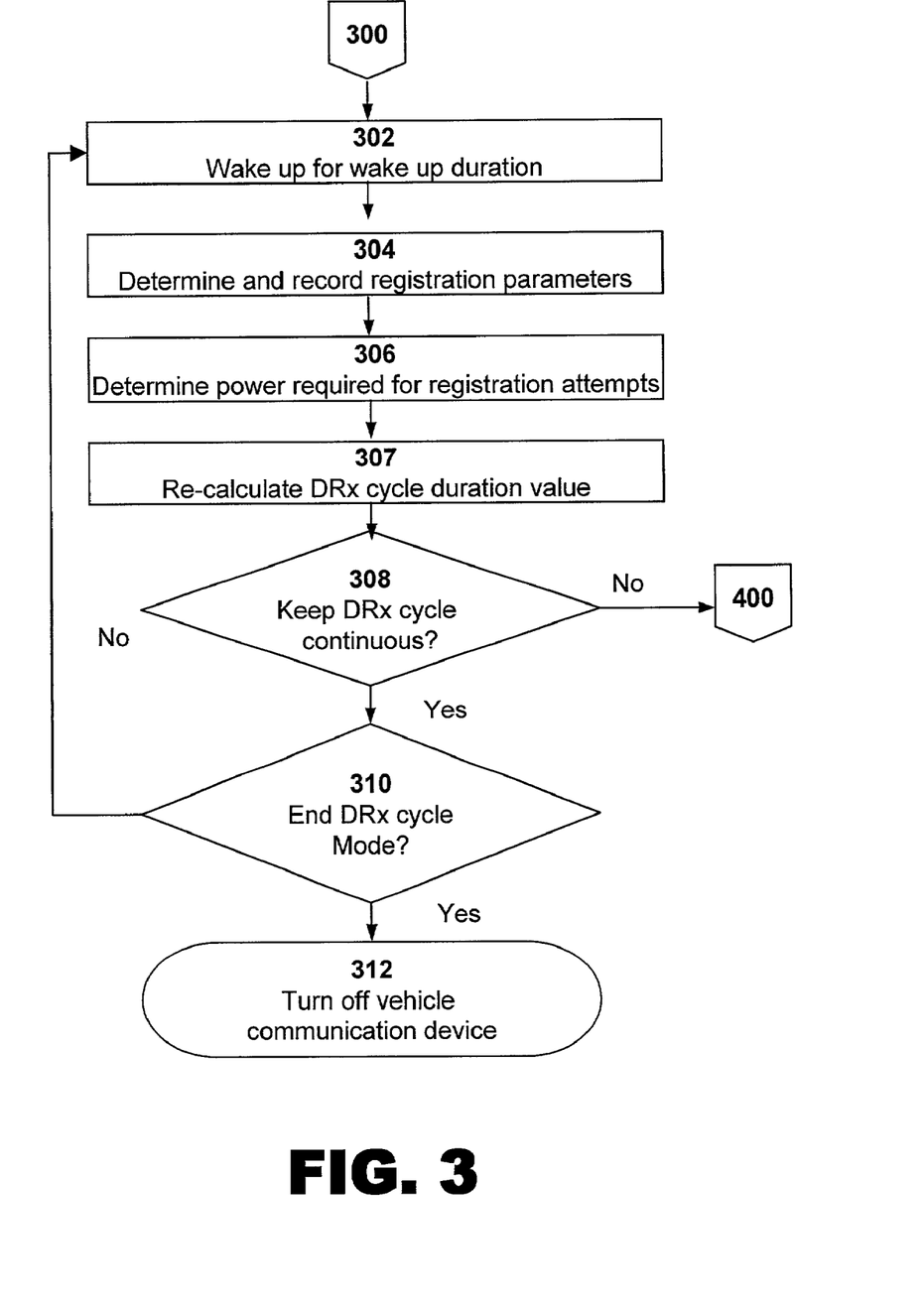
FIG. 3 is a flow diagram of one embodiment of a subroutine of the method shown in FIG. 2.

FIG. 3 shows one embodiment of a subroutine of a method for dynamically determining a discontinuous receive interval in a quiescent mobile vehicle in accordance with the present invention at 300. The subroutine of FIG. 3 may be used, for example, if the discontinuous receive sleep interval is a continuous interval.

As described above, one component of the DRx cycle may be a digital wakeup interval. As seen at block 302, once the vehicle communication device wakes, the digital wakeup interval begins and lasts for a given wakeup duration. The vehicle communication device may be enabled to receive communication service for the wakeup duration of the wakeup interval.

The value of the wakeup duration may be any suitable time value. For example, in one embodiment of the invention, the wakeup duration may be one day. Alternatively, the wakeup duration may be any value from 1 to 10 minutes, from 3 to 7 minutes or from 4 to 6 minutes. This wakeup duration may be a predetermined amount of time, during the DRx cycle, before the vehicle communication device enters a sleep interval. Alternatively, the wakeup duration may be a predetermined amount of time after which the vehicle communication device completely powers down.

While the vehicle communication device is awake during the duration of the wakeup interval, vehicle 110 may obtain one or more communication services as described above. The wakeup interval may allow a subscriber to use the vehicle communication device even after the vehicle's ignition is off. The wakeup interval allows delivery of telematics services even though the vehicle is powered down. One such instance may be if a subscriber locks his keys in the car and would like to use telematics to unlock the car. In accordance with the present invention, a vehicle communication device of vehicle 110 may be able to log registration attempts at block 304, while the vehicle communication device is awake for the wakeup duration.

As seen at block 304, registration parameters for the vehicle communication device may once again be measured and recorded. These may be the same registration parameters originally recorded at block 204. The registration parameter values determined at block 304 may be the same or different from the values determined at block 204 depending on network parameters and the activity of the vehicle communication device. The registration parameters for the vehicle communication device may include, for example, the number of times that the vehicle communication device attempts to register with a communication network 130, 140 via a wireless carrier system 120 during the wakeup duration. Any suitable method known in the art for logging the number of registration attempts made by a particular device in a given time period may be used.

As seen at block 306, the power required for the registration attempts made at block 304 may be determined. Several methods are known in the art for measuring the transmit power level used in one or more registration attempts of a wireless device. Typically, the value determined at block 306 will vary depending on which network the vehicle communication device is attempting to contact. For example, a nearby network may require a lower power level for transmission of a registration attempt than a network further away. One network may require registration attempts every ten minutes (e.g., six registration attempts per hour), which requires more power use than one that requires registration attempts every five minutes (e.g., twelve registration attempts per hour).

The values of the various registration parameters, once determined, may be stored by vehicle communication device for further use in accordance with the present invention.

As seen at block 307, the DRx cycle duration value may be re-calculated. As indicated above at block 216, the value of the DRx cycle duration may be calculated and re-calculated dynamically any suitable number of times in accordance with the present invention. Thus the value of the DRx cycle duration determined at block 307 may be the same or different than the value determined at block 216 depending on network conditions and the activity of the vehicle communication device. The value of the DRx cycle duration may be determined using any suitable means known in the art. In accordance with the present invention, a suitable algorithm may determine the DRx cycle duration value. This algorithm may recalculate the DRx cycle duration value based on the transmit power level recorded at block 202, on the registration parameters recorded at block 204, on the other power values recorded at block 206 or based on any suitable combination of the values gathered at blocks 202, 204, 206. Alternatively, the DRx cycle duration value may be recalculated on values obtained for a DRx sleep duration at block 212, values obtained for a wakeup duration at block 214, values obtained for a power down delay interval at block 216, or any suitable combination of the values obtained at block 212, 214,216. Alternatively, the DRx cycle duration value may be recalculated based on values obtained at block 304, alone or in combination with one or more of the values determined at blocks 202, 204, 206, 212, 214, 216.

At block 308, it may be determined whether the DRx cycle should remain continuous. In accordance with the present invention, this decision may be made based on data gathered dynamically as the vehicle is in DRx cycle mode. That is, the original power values gathered at blocks 202, 204, 206 resulted in values calculated for sleep interval at block 212, wakeup interval at block 214, DRx cycle duration at block 216 and power down delay interval at block 216. At block 306, new power values are gathered and at block 307 new values may be calculated. In the embodiment shown in FIG. 3, for example, a DRx cycle duration is recalculated although other values may also be recalculated. These recalculated values may be used to determine whether the DRx cycle should remain continuous or not.

Thus, for example, at block 216, it may be determined that the entire DRx cycle could last for a continuous duration of 72 hours based on power data gathered at the time the vehicle's ignition was turned off. However, at block 306, it may be determined that the vehicle communication device uses more power during the wakeup interval initiated at block 302. For example, the vehicle communication device is trying to contact a network that requires a higher number of registration attempts (thus a higher number of attempts is logged at block 304 than were originally logged at block 204).

Based on this new data, it may be determined that the DRx cycle will only be able to last for a duration of 72 hours if it becomes a periodic cycle which enters a sleep interval every 2 hours. If such a determination is made, the routine of the present invention may proceed to block 400. Alternatively, it may be determined that DRx cycle may remain continuous only if the DRx cycle duration value is adjusted to 52 hours. In such a case, the routine of the present invention may proceed to block 310. Although two scenarios are described herein, myriad adjustments of the DRx cycle values may be made based on the dynamically gathered network data in accordance with the present invention. The sample adjustments to DRx cycle values disclosed above are intended as illustration. Various changes and modifications to DRx cycle values, including changing sleep interval duration, wakeup interval duration, power down delay interval values and DRx cycle duration values, may be made without departing from the spirit and scope of the invention.

At block 310, it may be determined whether the DRx cycle duration has elapsed. If the DRx cycle duration has not yet elapsed, the vehicle communication device may return to block 302 and remain awake for the duration of the wakeup interval. The determination of whether the DRx cycle duration should end may also be influenced by values determined at blocks 202, 204, 206, 208, 212, 214, 216, 304. For example, at block 216, it may be determined that the entire DRx cycle could last for a continuous duration of 72 hours based on power data gathered at the time the vehicle's ignition was turned off. However, at block 306, it may be determined that the vehicle communication device uses less power during the wakeup interval initiated at block 302. For example, the vehicle communication device is trying to contact a network that requires a lower number of registration attempts (thus a lower number of attempts is logged at block 304 than were originally logged at block 204).

Based on this new data, it may be determined that the DRx cycle may last for a duration of 76 hours. Thus, although the original 72 hours may have elapsed at block 310, the DRx cycle may not yet end because of the dynamically recalculated values from blocks 304, 306.

Alternatively, if at block 310, it is determined the Sleep cycle duration has elapsed, the vehicle communication device may be powered down as shown at block 312.

FIG. 4 shows another embodiment of a subroutine of a method for dynamically determining a discontinuous receive interval in a quiescent mobile vehicle in accordance with the present invention at 400. The subroutine of FIG. 4 may be used, for example, if the discontinuous receive sleep interval is a periodic interval.

Thus, once the power down delay interval of block 210 has elapsed, the vehicle communication device of vehicle 110 may enter a digital discontinuous-receive (DRx) Sleep cycle, which will last for a DRx cycle duration, such as the DRx cycle duration determined above at block 216. The value of the DRx cycle duration may be any suitable time value. For example, in one embodiment of the invention, the DRx cycle duration may be two days. This DRx cycle duration may be a predetermined amount of time before the vehicle communication device completely powers down This DRx cycle may be comprised of a wakeup interval that has a specific duration (wakeup duration) and a sleep interval that also has its own duration (sleep duration). The vehicle communication device is enabled to receive communication service during the wakeup interval and is not enabled to receive communication service during the sleep interval. In the embodiment of FIG. 4, this DRx cycle is periodic (consisting of several cycles of wakeup and sleep intervals).

As seen at block 401, the vehicle communication device may enter the DRx cycle by entering a sleep interval which lasts for a given sleep duration. The vehicle communication device may not be enabled to receive communication service for the duration of the sleep interval.

The value of the sleep duration may be any suitable time value. For example, in one embodiment of the invention, the sleep duration may be one day. Alternatively, the sleep duration may be any value from 1 to 10 minutes, from 3 to 7 minutes or from 4 to 6 minutes. This sleep duration may be a predetermined amount of time, during the DRx cycle, when the vehicle communication device is powered down to improve current drain.

As seen at block 402, the vehicle communication device may wake after the sleep duration elapses. Once the vehicle communication device wakes, the digital wakeup interval begins and lasts for a given wakeup duration. The vehicle communication device may be enabled to receive communication service for the wakeup duration of the wakeup interval.

The value of the wakeup duration may be any suitable time value. For example, in one embodiment of the invention, the wakeup duration may be one day. Alternatively, the wakeup duration may be any value from 1 to 10 minutes, from 3 to 7 minutes or from 4 to 6 minutes. This wakeup duration may be a predetermined amount of time, during the DRx cycle, before the vehicle communication device enters a sleep interval.

While the vehicle communication device is awake during the duration of the wakeup interval, vehicle 110 may obtain one or more communication service as described above. The wakeup interval may allow a subscriber to use the vehicle communication device even after the vehicle's ignition is off. The wakeup interval allows delivery of telematics services even though the vehicle is powered down. One such instance may be if a subscriber locks his keys in the car and would like to use telematics to unlock the car. In accordance with the present invention, a vehicle communication device of vehicle 110 may be able to registration parameters, such as number of registration attempts, at block 404.

At block 404, registration parameters for the vehicle communication device may once again be measured and recorded. The registration parameters for the vehicle communication device may include, for example, the number of times that the vehicle communication device attempts to register with a communication network 130, 140 via a wireless carrier system 120 during the wakeup duration. Any suitable method known in the art for logging the number of registration attempts made by a particular device in a given time period may be used.

At block 406, the power required for the registration attempts made at block 404 may be determined. Several methods are known in the art for measuring the transmit power level used in one or more registration attempts of a wireless device. Typically, the value determined at block 406 will vary depending on which network the vehicle communication device is attempting to contact. For example, a nearby network may require a lower power level for transmission of a registration attempt than a network further away. One network may require registration attempts every ten minutes (e.g., six registration attempts per hour), which requires more power use than one that requires registration attempts every five minutes (e.g., twelve registration attempts per hour).

The values of the various registration parameters, once determined, may be stored by vehicle communication device for further use in accordance with the present invention.

At block 408, a new value may be determined for a sleep duration. The value of the sleep duration may be determined using any suitable means known in the art. In accordance with the present invention, a suitable algorithm may determine the sleep duration value based on the values determined at block 406. In addition, the new sleep duration value may also be based on the transmit power parameters recorded at block 202, on the registration parameters recorded at block 204, on the other power values recorded at block 206 or based on any suitable combination of the values gathered at blocks 202, 204, 206. Alternatively, the algorithm for determining the sleep duration value may be based on values originally obtained for a sleep duration at block 212, values obtained for a wakeup duration at block 214 or at block 410, values obtained for a DRx cycle duration at block 216 or at block 412, values obtained for a power down delay interval at block 208, or any suitable combination of the values obtained at block 208, 212, 214, 216, 410, 412.

At block 410, a new value may be determined for a wakeup duration. The value of the wakeup duration may be determined using any suitable means known in the art. In accordance with the present invention, a suitable algorithm may determine the wakeup duration value based on the values determined at block 406. In addition, the new wakeup duration value may be based on the transmit power level recorded at block 202, on the registration parameters recorded at block 204, on the other power values recorded at block 206 or based on any suitable combination of the values gathered at blocks 202, 204, 206. Alternatively, the algorithm for determining the wakeup duration value may be based on values obtained for a wakeup duration at block 214, values obtained for a DRx sleep interval at block 212 or at block 408, values obtained for a DRx cycle duration at block 216 or at block 412, values obtained for a power down delay interval at block 208, or any suitable combination of the values obtained at block 208, 212, 214, 216, 408, 412.

At block 412, a new value may be determined for a DRx cycle duration. The value of the DRx cycle duration may be determined using any suitable means known in the art. In accordance with the present invention, a suitable algorithm may determine the DRx cycle duration value based on the values determined at block 406. In addition the new DRx cycle duration value may be based on the transmit power parameters recorded at block 202, on the registration parameters recorded at block 204, on the other power values recorded at block 206 or based on any suitable combination of the values gathered at blocks 202, 204, 206. Alternatively, the algorithm for determining the DRx cycle duration value may be based on values obtained for a DRx cycle duration obtained at block 216, on values obtained for a DRx sleep interval at block 212 or block 408, values obtained for a wakeup duration at block 214 or block 410, values obtained for a power down delay interval at block 216, or any suitable combination of the values obtained at block 208, 212, 214, 216, 408, 410.

As seen in FIG. 4, new Sleep cycle values may be dynamically generated in accordance with the present invention for the entire time that the vehicle communication device is in a DRx cycle. That is, the original power values gathered at blocks 202, 204, 206 resulted in Sleep cycle values calculated for sleep interval at block 212, wakeup interval at block 214, DRx cycle duration at block 216 and power down delay interval at block 208. At block 404, new power values are gathered and at block 406 new power values may be calculated so that at blocks 408, 410, 412 new Sleep cycle values may be determined or the previous values recalculated.

Thus, for example, at block 216, it may be determined that a given vehicle's Sleep cycle could last for a continuous duration of 72 hours based on power data gathered at the time the vehicle's ignition was turned off. However, at block 406, it may be determined that the vehicle communication device uses less power during the wakeup interval initiated at block 402. For example, the vehicle communication device is trying to contact a network that requires a lower number of registration attempts per hour (thus a lower number of attempts is logged at block 404 than were originally logged at block 204). Based on this new data, it may be determined that the DRx cycle may be maintained for a duration of 74 hours rather than the original value of 72 hours. Although several examples are described herein, myriad adjustments of the Sleep cycle values may be made based on the dynamically gathered power data in accordance with the present invention. The sample adjustments to Sleep cycle values disclosed above are intended as illustration. Various changes and modifications to Sleep cycle values, including changing sleep interval duration, wakeup interval duration, power down delay interval values and Sleep cycle duration values, may be made without departing from the spirit and scope of the invention.

At block 414, it may be determined whether the DRx cycle duration has elapsed. If the DRx cycle duration has not yet elapsed, the vehicle communication device may return to block 401 and enter another sleep interval before proceeding to block 402 to enter another wakeup interval.

Alternatively, if at block 414, it is determined the Sleep cycle duration has ended, the vehicle communication device may be powered down as shown at block 420.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for use in a mobile vehicle for communicating over a digital wireless communication system, comprising:
   determining at least one registration parameter responsive to communication between a vehicle communication device and a wireless network, wherein the at least one registration parameter is responsive to an amount of power required for a vehicle communication device in the vehicle to communicate on a wireless network;
   adjusting a quiescent operating cycle of the vehicle communication device based on the determination, wherein the quiescent operating cycle lasts for a first duration if the amount of power is a first value and lasts for a second duration if the amount of power is a second value; and
   operating the vehicle communication device according to the adjusted quiescent operating cycle.

2. The method according to claim 1, wherein the quiescent operating cycle is a discontinuous-receive cycle.

3. The method according to claim 1, wherein the quiescent operating cycle is continuous if the amount of power is a first value; and the quiescent operating cycle includes at least one sleep interval if the amount of power is a second value greater than the first value.

4. The method of claim 1, wherein the first duration is greater than the second duration if the first value is less than the second value.

5. A method for use in a mobile vehicle for communicating over a wireless communication system, comprising:

determining at least one registration parameter responsive to communication between a vehicle communication device and a wireless network, wherein the at least one registration parameter is responsive to an amount of power required for a vehicle communication device in the vehicle to communicate on a wireless network;

adjusting a quiescent operating cycle of the vehicle communication device based on the determination, wherein the quiescent operating cycle lasts for a first duration if the amount of power is a first value and lasts for a second duration if the amount of power is a second value; and operating the vehicle communication device according to the adjusted quiescent operating cycle, wherein the quiescent operating cycle includes a discontinuous-receive cycle.

6. The method according to claim 5, wherein the quiescent operating cycle is a discontinuous-receive cycle.

7. The method according to claim 5, wherein the quiescent operating cycle is continuous if the amount of power is a first value and the quiescent operating cycle includes at least one sleep interval if the amount of power is a second value greater than the first value.

8. The method of claim 5, wherein the first duration is greater than the second duration if the first value is less than the second value.

\* \* \* \* \*